United States Patent Office 3,551,241
Patented Dec. 29, 1970

3,551,241
PROCESS FOR PRODUCING A DECORATIVE LAMINATE COMPRISING TRANSFERRING A FILM OF A TRANSPARENT NOBLE THERMOSETTING RESIN TO A DECORATIVE SHEET FROM A FLEXIBLE RELEASE TRANSFER SHEET AND REMOVING THE FLEXIBLE RELEASE SHEET AFTER THE HEAT AND PRESSURE CONSOLIDATION STEP
Albert Joseph Heeb and Gene Edward Grosheim, Cincinnati, Ohio, assignors to Formica Corporation, Cincinnati, Ohio, a corporation of Delaware
No Drawing. Filed Aug. 23, 1967, Ser. No. 662,564
Int. Cl. B32b 31/12; B44c 3/02
U.S. Cl. 156—230
10 Claims

ABSTRACT OF THE DISCLOSURE

A process for preparing a decorative laminate comprising (A) superimposing in stacked relationship an assembly of (a) a rigidity imparting base member, (b) a decorative fibrous sheet impregnated with a noble thermosetting resin and (c) a flexible release transfer sheet, coated on one side only, with a film of a transparent noble thermosetting resin in contact with the derocative sheet, (B) heat and pressure consolidating the entire assembly into a unitary structure and (C) removing the flexible release sheet.

BACKGROUND OF THE INVENTION

Decorative laminates have long been produced commercially by assembling a plurality of layers of material at least some of which are impregnated with thermosetting resins in superimposed relationship and heat and pressure consolidated to a unitary structure. Certain decorative laminates have been produced commercially by assembling a plurality of thermosetting phenolformaldehyde resin impregnated kraft paper core sheets in superimposed relationship onto which is placed a decorative sheet of a finer textured paper such as alpha-cellulose paper sheet which has been impregnated with a noble thermosetting resin such as a thermosetting melamine-formaldehyde resin and, optionally an overlay sheet which has also been impregnated with a thermosetting noble resin such as the same thermosetting melamine-formaldehyde resin positioned on top of and in contact with the decorative sheet and heat and pressure consolidating the assembly to a unitary structure. These decorative laminates have found extensive application as countertops for kitchens, bathrooms and horizontal as well as vertical surfaces for furniture such as tables, dressers, and the like. Additionally, these decorative laminates can be used as vertical wall coverings for indoor use. These laminated materials have excellent durability when used indoors and when they are not subjected to the great variations of weather to which outdoor panels are subjected. When the laminates of the prior art are exposed to outdoor weathering for significant periods of time, some of these laminates undergo progressive deterioration as is observed by such defects as delamination, crazing, cracking and discoloring, among other defects. The majority of decorative laminates of the prior art have as the rigidity imparting base member the aforementioned kraft paper core sheet or sheets impregnated with a thermosetting phenolic resin. Other rigidity imparting base members have been used such as flakeboard panels, solid natural wood boards, plywood, hardboard, cement-asbestos board, and the like.

FIELD OF THE INVENTION

The present invention resides in making laminates by a particular technique of transferring a resinous or polymeric film from a flexible release transfer sheet, coated on one side only, and placed in contact with the noble thermosetting resin impregnated decorative sheet and after the heat and pressure consolidation step has been completed during which the film becomes very securely bonded to the decorative sheet the transfer release sheet is readily stripped off of the finished laminate to leave the surface thereof carrying the coating of the polymeric film.

DESCRIPTION OF THE PRIOR ART

The closest prior art of which the instant Applicants are aware of are the U.S. Pat. 2,545,832 and 3,049,458. The latter patent discloses the coating of a platen surface with an incompletely cured polydiallyl phthalate resin film but in an endeavor to practice this suggested process, a plurality of undesirable limitations are developed characterized by the presence of extremely thin resin surfaces such as dull spots and pitting, all of which contribute to poor surface properties such as poor resistance to abrasion, water, stains, ultraviolet light and chemicals.

SUMMARY OF THE INVENTION

This invention relates to a process for preparing a decorative laminate comprising superimposing in stacked relationship an assembly of a rigidity imparting base member upon which there is superimposed a decorative fibrous sheet impregnated with a noble resin such as a melamine resin covered with a protective transparent film. The component that is superimposed upon the decorative fibrous sheet is prepared in advance of the preparation of the stacked assembly. When the flexible release transfer sheet is coated on one side only with a film of a transparent noble thermosetting resin and dried to the proper condition as will be outlined in greater detail hereinbelow, the transfer sheet is then superimposed onto the decorative sheet with the film on one side only so as to place said film in direct contact with the decorative sheet. Thereupon, the assembly is ready for insertion into a laminating press and upon the closing of the platens, the conventional heat and pressure conditions are exerted, and the entire assembly is consolidated into a unitary structure. The laminating press is then opened, the laminate removed and cooled, and the flexible release sheet is removed producing a laminate having an improved surface, dimensional stability and attractive appearance.

One of the objects of the present invention is to produce a decorative laminate surfaced with a film of a transparent noble thermosetting resin by a technique which facilitates the transfer of the surface film from a flexible release carrier sheet which sheet upon being stripped from the decorative laminate upon the completion of the consolidation step can be discarded and no need is presented to preserve and maintain the smoothness of the surface of the transfer sheet since it is only used once. A further object of the present invention is to provide a continuous web of a flexible release transfer sheet coated on one side only with a film of a transparent noble thermosetting resin whereby such transfer sheets can be cut in selected lengths in a mass production operation which enables one to produce laminates which have uniformly excellent surface properties and significantly enhanced outdoor weatherability properties. These and other objects of the present invention will be discussed in greater detail hereinbelow.

As has been mentioned hereinabove, the base member is a rigidity imparting layer which may be rigid at the outset as would be the case in the use of a panel of flakeboard, plywood, hardboard, cement-asbestos board, and the like, or it may be a thermosetting resin impregnated kraft paper core sheet or sheets, which although flexible at the point of insertion into the assembly, said core sheet or sheets nevertheless during the course of the conslidation step wherein the thermosetting resin becomes converted to a thermoset resin and the individual core sheet or sheets become fused and the entire assembly of the core in the final unitary structure is a rigidity imparting base member. Generally, the number of core sheets that are used varies between about 1 and about 9 kraft paper sheets depending upon the thickness of the ultimate laminate desired.

The decorative sheet may be a solid color paper of a finer quality than the kraft paper in the core and is generally composed of alpha-cellulose fibers. In a solid color, such colors as white and the pastels such as yellow, pink, green, and the like, may also be used. The decorative sheet, on the other hand, may carry on its exposed surface, a printed design such as a wood print, a floral print, or a geometrical design. In conventional laminates when a solid color decorative sheet is used, there is generally no need to make use of an overlay sheet especially for indoor applications since the solid color sheet is completely homogenous and does not undergo any significant deterioration. On the other hand, when the decorative sheet is a printed design it has been conventional in the past to superimposed onto said print sheet a layer of alpha-cellulose paper impregnated generally with the same resin used to impregnate the decorative sheet, which covering sheet is referred to as an overlay sheet and under the conditions of consolidating, said overlay sheet becomes transparent notwithstanding the presence of the cellulosic fibers in said overlay sheet. The transparent characteristic of the overlay sheet is required in order to be able to see the decorative sheet therethrough. These overlay sheets provide the measure of protection required for the print sheet when the laminate is used for indoor applications. However, when the laminate is to be used for outdoor applications, such an overlay sheet upon exposure for prolonged periods of time to extremes of adverse weather develop certain defects and deficiencies which render such a decorative laminate unsuitable for outdoor use. It is speculated that the presence of the cellulosic fibers in the overlay, especially those at the surface of the overlay sheet, provide sites for the inroads of attack due to varying adverse weather extremes, which inroads cause such defects as crazing, cracking, delamination and the like. By applying a film to the decorative sheet, which film contains no cellulosic fibers, the protection of the decorative sheet is accomplished without providing the sites for the inroads leading to defects. Although the decorative sheet is preferably impregnated with a thermosetting melamine-formaldehyde resin, other noble resins may be substituted for said thermosetting melamine-formaldehyde resins such as the unsaturated polyester resin compositions, the epoxy resinous materials, and the like. The term "noble resin" is one conventionally used in the art to designate a resinous material which does not undergo any appreciable color deterioration during the heat and pressure consolidation step used in the preparation of the laminate. The phenolic resins are ordinarily not considered to be a noble resin because when subjected to heat and pressure, the phenolic resins do undergo significant discoloration changing from a light amber color to a dark brown during the laminating step. Other noble resins which can be used are the aminoplast resins such as the urea-formaldehyde resins, the thiourea-formaldehyde resins, triazine resins such as benzoguanamine-formaldehyde resins and the like but the melamine-formaldehyde resins are, however, preferred.

In preparing the flexible release transfer sheet for use in the practice of the process of the present invention, one may select a release sheet which may be any one of a plurality of available materials such as a nonadherable paper of a nonadherable aluminum foil. The nonadherable papers such as parchment paper, of which a plurality are available commercially, may be used. Also suitable are papers coated, treated, or impregnated with polyethylene, polypropylene or the polyfluorocarbons such as polytetrafluoroethylene. Silicone oil treated papers may also be used and are available commercially. Papers coated with sodium alginate are suitable also and are also available commercially. Papers treated with thermosetting resins and then converted to the thermoset state such as the aminoplast resins referred to hereinabove may be used wherein the resin is substantially completely cured. These thermoset resin treated papers are satisfactory for this purpose and are known in the art. Still further, papers treated with a fully cured thermoset silicone resin are also suitable. One of the preferred release sheets to be used as a carrier for the film is a commercially available aluminum foil onto the back of which is mounted a thin sheet of paper bonded to the foil by use of a conventional foil adhesive. In using such a foil-paper release sheet the metal side of the sheet is coated with a film of the transparent thermosetting noble resin and in preparing the laminate assembly the metal surface thus coated is placed face down onto the decorative sheet with the paper side of the release sheet away from the laminate assembly.

The resins used to apply a coating on the flexible release transfer sheet may be any one of a plurality of commercially available transparent noble thermosetting resins such as the polymers of a diester of an allyl alcohol and a phthalic acid. As applied to the transfer sheet, such a resinous material is comprised of a solution of a mixture of a polymer of a diester of an allyl alcohol and a phthalic acid and a monomeric diester of an allyl alcohol and a phthalic acid dissolved or dispersed in an inert organic solvent. In the monomer state, these esters are diesters and substantially all of the carboxyl groups of the selected phthalic acid are esterified with an allyl alcohol. Thereafter, conventional polymerization is achieved thereby converting the monomeric diallyl ester of a phthalic acid to a solution of polydiallyl ester of a phthalic acid dissolved in residual monomer of an allyl ester of phthalic acid. In preparing such as monomeric material such allyl alcohols may be used as allyl alcohol, methallyl alcohol, ethallyl alcohol, and the like. Among the phthalic acids which may be used to form the monomeric diester are phthalic acid per se, sometimes identified more precisely as orthophthalic acid, isophthalic acid (the meta form) and terephthalic acid (the para form). Additionally, one can make use of the tetrahydrophthalic acid, the hexahydrophthalic acid and the halosubstituted phthalic acids, such as the tetrachlorophthalic acid, and the like.

In preparing the allyl ester monomers, one can start with the phthalic acids per se or the anhydrides thereof whenever available. For most applications, it is preferred to use the polymer of the diallyl ester of orthophthalic acid as the film coating material. For outdoor applications where such laminates will be exposed to the extremes of temperatures and humidities, it is preferred to make use as the polymer of the diallyl ester of the hexahydroorthophthalic acid or anhydride and for fire-retartant panels, poly(allyltetrachlorophthalate).

A plurality of processes are known and have been published for the preparation of these polymers of diallyl phthalates. To illustrate the process for preparing such polymers attention is directed to the U.S. Pats. 2,990,388, 3,131,088, 3,154,454 and 3,200,008 each of which is incorporated herein by reference. Still further, these polymeric esters are commercially available from a plurality of sources.

As used in the practice of the process of the present invention, it is desired that the polymer-monomer solution be used in a reverse roll coating technique to impart a surface film or layer to the flexible release transfer sheet in a solution having certain solids content in order to insure that the polymeric ester is deposited on said transfer sheet which is then heated at the required temperature in order to reduce the nonpolymeric volatiles below about 8%, by weight, based on the total weight of the coated sheet. To accomplish this end, the polymer-monomer in solution should be in such an amount that the polymer-monomer solid content is varied between about 45% and about 55%, by weight, based on the total weight of the solution containing a viscosity builder such as finely divided silicon dioxide. If the allyl polymer-monomer composition is used in a neat solution (no viscosity builders) the polymer-monomer solids content is controlled between about 47% and 57%, by weight, based on the total weight of the solution. The amount of viscosity builder can, therefore, be varied between about 0% and 7%, by weight, based on the weight of the polymer-monomer solids. As used, the solution will contain the above stated percentages of polymer-monomer solids and the remaining portion will be made up primarily of relatively minor amounts of catalysts, release agents or other conventional additives and the remaining dispersion medium for the polymer-monomer solids will be an inert organic solvent of which a plurality are known to exist that dissolve these allyl ester polymers. Illustrative of such solvents are low molecular weight ketones such as acetone, methyl ethyl ketones, diethyl ketone and the like. Aromatic solvents such as benzene, toluene, xylene and the like may also be used as well as ester solvents such as methyl acetate, ethyl acetate and the like. Mixtures of these solvents not only may be used but sometimes are preferably used as a mixture of a preponderant amount of methyl ethyl ketone and a minor amount of toluene. The thickness of the wet film as applied to the transfer sheet is not critical and may be varied between about 0.002 inch and 0.015 inch. Preferably, the wet film thickness is varied between about 0.004 inch and about 0.008 inch. After the coating operation is completed and the coated sheet dried, the film thickness will generally be varied between about 0.001 inch and 0.008 inch and preferably between about 0.002 inch and 0.004 inch. There is consequently a close relationship between the amount of polymer-monomer solids in solution and the viscosity of the solution. This viscosity measurement, however, will vary, depending on the type of solvent used as the solvent medium and the polymeric ester material. It is sometimes desirable to build up the viscosity of a given solution of polymer-monomer where it contains the right measure of polymer-monomer solids and the correct specific gravity but wherein the viscosity is too low for commercially acceptable deposition of the film onto the transfer release sheet. This can be accomplished by adding to the solution materials which are known to impart viscosity build-up to a solution such as silic aerogel, and the like. For best commercial operations, it is, therefore, desired to make use of a polymer-monomer solution of a viscosity of from about 400 to about 2000 centipoises when measured at 25° C.

Another class of resins which may be used as the coating on the flexible release transfer sheet is a group of unsaturated polyester resin compositions such as those shown in the U.S. Pat. 2,255,313 and 2,443,735–41, inclusive, all of which patents are incorporated herein by reference. A particularly superior class of these unsaturated polyester resins are also disclosed in the U.S. Pat. 3,294,620, which patent is also incorporated herein by reference. Although these newly developed unsaturated polyester resin compositions are self-cross-linkable, one may, nevertheless, utilize a cross-linking agent therewith for certain advantageous purposes when and as desired as the aforesaid patent indicates. Particularly advantageous and enhanced results are achieved by using as the cross-linking agent a monomeric polyacrylate of which a plurality are commercially available and an entire host of the same are well known in the art such as the ethylene glycol dimethacrylate, trimethylol propane trimethacrylate, and the like. The glycol diacrylates are prepared by esterifying an alpha, beta, ethylenically unsaturated monocarboxylic acid selected from the group consisting of acrylic acid and methacrylic acid with a glycol selected from the group consisting of polyglycols such as those having from 4 to 8 carbon atoms and monoglycols such as those containing from 2 to 4 carbon atoms. Among the polyglycols which may be used to produce the glycol diacrylates are diethylene glycol, triethylene glycol, tetraethylene glycol, dipropylene glycol, and bis-(4-hydroxybutyl)-ether. Among the monoglycols which may be used to esterify the acrylic acids are ethylene glycol, propylene glycol, and the propanediols-1,2 and 1,3 and the butanediols-1,2; 1,3; and 1.4. These glycol diacrylates can be used with the polyesters of U.S. Pat. No. 3,294,620 either singly or in combination with one another. However, whether used singly or in combination, the glycol diacrylate should be present in the total composition in an amount varying between about 10% and 40%, by weight, based on the total weight of said polyester and said glycol diacrylate.

Other noble thermosetting resins which may be used to provide the film on the release transfer sheet are the epoxy resins of which a plurality are available commercially. Cross-linking acrylic resins which may be deposited on the release sheet either from an organic solvent solution or from an aqueous emulsion and containing as a cross-linking agent, for example, hexakismethoxymethyl melamine such as those shown in the U.S. Pat. No. 3,304,-280 and the U.S. Pat. No. 3,218,225, each of which patents are incorporated herein by reference. Additionally, one may make use of other triazine resins besides the melamine-formaldehyde resins such as the formoguanamine resins, the acetoguanamine resins, the benzoguanamine resins and the like as is shown by the U.S. Pat. No. 2,197,357.

The noble resin used to impregnate the decorative sheet may be the same noble resin which is used to coat the transfer release sheet or it may be different therefrom provided that the two different resins do not display any incompatibility with one another.

The release media may be coated on the release face, i.e., on one side thereof with the solution or dispersion of the surface resin in any number of different methods such as by single immersion, spray, reverse roll coating, rotogravure printing, curtain coating and the like. The reverse roll coating method using a three-roll coater, commercially called a puddle coater, is preferred. The amount of surface resin applied to the release media is dependent upon a number of factors, for instance, the type of resin the property requirements of the finished article, the coating equipment limitation and other processing conditions. The amount of resin cast on the release media may be permitted to vary between about 4 g./sq. ft. to about 15 g./sq. ft. of resin solids (these amounts refer to the weight of the dried solid resin and not to the weight of the resin solution or dispersion). It is preferred to apply about 7 g./sq. ft. ± 1.3 g./sq. ft. onto the release paper. This preferred amount of resin solids deposit has been determined to be adequate for the manufacture of products with preferred properties. After the resin solution has been deposited on the release media, the solvents or dispersion media are driven off by passing the coated release sheet through an oven or other method of drying. In addition to removing the solvents, the resin is preferably advanced slightly to the B-stage, i.e., the thermosetting type resins leaving an essentially dry film deposited on the release media. The extent of solvent removal and/or of B-staging is controlled by the residence time in an oven or other means of solvent removal, by the amount of resin solution deposited, by the temperature of the drying media and by the amount of air flow around and over the resin film to be dried and/or advanced to the B-stage. It is preferred to dry and advance the wet film in a forced air circulated oven for about three minutes at about 110° C. in order to attain a volatile content of the dried resin coated release paper of about 2.3±0.3% and a flow of about 0% to about 5% as measured on a standard flow tester at 200 p.s.i.

When phenolic resin impregnated graft sheets are used as the rigidity imparting base member, the assembly is heat and pressure consolidated to finalize the resin cure under press conditions which are very similar to those used for conventional decorative laminates. On the other hand, where rigid core materials are used such as cement-asbestos board, particle board and the like, the press pressures used are generally lower than those used to manufacture a high pressure decorative laminate. Instead of using the conventional 1000 to 1400 p.s.i. on such a material, pressures in the range of 200–600 p.s.i. are employed for these cores. After the pressing and heating step is completed, the article is removed from the press and the release media is stripped off from the surface resin film which latter remains permanently and securely bonded to the decorative sheet of the laminate or panel. The gloss level of the finished article may be adjusted to any desired level depending upon the selection of the type of release media and upon the gloss variations attainable from each of these release materials. Certain additives may be included in the surface coating resin to further adjust the gloss level of the face of the finished article.

In order that the concept of the present invention may be more completely understood, the following examples are set forth in which all parts are parts, by weight, unless otherwise indicated. These examples are set forth primarily for the purpose of illustration and any specific enumeration of detail contained therein should not be interpreted as a limitation on the case except as is recited in the appended claims.

EXAMPLE 1

A series of solutions of polydiallyl phthalate were prepared having the contents of the various components set forth hereinbelow:

TABLE

| Component | Component range | Preferred coating mix |
|---|---|---|
| Methyl ethyl ketone | 20–50 | 34.64 |
| Toluene | 5–12.5 | 8.66 |
| DAP monomer | 0.5–10 | 2.04 |
| Lauric acid | 0.05–2 | 0.51 |
| Dicumyl peroxide | 0–10 | 1.53 |
| DAP polymer | 30–60 | 49.02 |
| Colloidal silica | 0–7 | 2.78 |
| Benzoyl peroxide | 0–4 | 0.82 |
| Total | | 100.00 |

The preferred mix above is prepared by dissolving with agitation at room temperature the solid components item by item in the liquid components. The resultant analysis of such a mix is as follows:

Viscosity, cps. at 25° C.—1300±200
Color—100 max.
Gel time—7.5±1.5 min.
Total solids content, percent—58.0±2.0 (ASTM tests)

The preferred composition set forth hereinabove was used to coat a commercially available release paper on one side only with a solution of said preferred resinous solution and dried for about 3 minutes at about 110° C. The amount of resin on the release paper was about 7 g./sq. ft. of the diallyl phthalate resin solids. A laminate assembly is then prepared by arranging in stacked relationship seven kraft paper core sheets which had been preimpregnated with a thermosetting phenol resin and dried. Immediately above the uppermost kraft paper core sheet there is positioned a decorative sheet of alpha-cellulose paper impregnated with a thermosetting melamine-formaldehyde resin. Immediately above said decorative sheet there is positioned the polydiallyl phthalate coated release sheet paper with the polydiallyl phthalate film in direct contact with the printed sheet and the entire assembly is inserted into a conventional laminating press and the entire assembly heat and pressure consolidated to a unitary structure using temperatures between 130°C. and 150° C. and a pressure of about 1400 p.s.i. Upon removal from the press, the release paper is stripped from the laminate structure revealing a smooth, uniform layer of polydiallyl phthalate on the surface of the laminate. Laminates or panels prepared in this manner provide improved surface dimensional stability while maintaining all other desirable properties of conventional high pressure decorative laminates.

EXAMPLE 2

Into a suitable reaction vessel equipped with stirrer, thermometer, temperature controller, gas inlet tube (below the liquid surface), and a gas exit tube fitted with a steam condenser, there is introduced 247 parts of 1,3-butylene glycol, 792 parts of 1,4-cyclohexanedimethanol, 580 parts of fumaric acid, 385 parts of hexahydrophthalic anhydride and 2 parts of tertiary butyl catechol. The reactants are blanketed with a carbon dioxide atmosphere (200–300 cc./minute) and heated with constant stirring to about 195–200° C. until an acid number of about 15 is reached. The condenser is then removed and the inert gas rate is increased to about 10 liter/minute in order to remove the excess glycol. The sparging is continued until a sample of the resin has a hardness value of 38–40, as measured at 25° C. with a Barcol Model 936 "Impressor." The final acid number is 10.8. The finished resin is cooled to 170° C. and poured with stirring into sufficient toluene so as to prepare a 62% resin solids solution.

The mechanical procedure of Example 1 is repeated in all essential details including the application of the resin solution to the release sheet except that in the place of the polydiallyl phthalate there is used the unsaturated polyester resin of the present example. After stripping the release sheet from the surface of the cross-linked polyester resin there is revealed a smooth uniformly thick layer of the polyester resin securely bonded to the unitary structure. The properties of this laminate are essentially identical with those of Example 1 in addition to providing excellent outdoor weathering characteristics.

EXAMPLE 3

Example 2 is repeated in all essential details except that there is added to the unsaturated polyester resin before its application to the release sheet 7%, by weight, based on the weight of the polyester resin of monomeric 1,3-butylene glycol dimethacrylate. Comparably excellent laminates were produced. Properties of this laminate are identical to those of Example 2 but provide improved weathering characteristics, particularly, added resistance to surface crazing.

EXAMPLE 4

Example 3 is repeated in all essential details except that in the place of the monomeric 1,3-butylene glycol dimethacrylate there is substituted an equivalent amount of trimethylolpropane trimethacrylate. Comparably excellent laminates were produced. Laminate properties were found to be equivalent to those of Example 3.

EXAMPLE 5

Example 1 is repeated in all essential details except that in the place of the poly(diallyl phthalate) and the monomeric diallyl phthalate there is substituted equivalent amounts of poly(diallylhexahydrophthalate) and monomeric diallylhexahydrophthalate. Comparably good laminates were produced and properties were comparable to those of Examples 2, 3, and 4.

EXAMPLE 6

Example 1 is again repeated in all essential details except that in the place of the poly(diallyl phthalate) and the monomeric diallyl phthalate there is substituted equivalent amounts of poly(diallyltetrachlorophthalate) and monomeric tetrachlorophthalate.

EXAMPLE 7

Example 1 is repeated in all essential details with the following exception. The surface resin mix as applied to the release paper by reverse roll coater is as follows:

| | Parts by weight |
|---|---|
| Methyl ethyl ketone | 425.00 |
| Toluol | 106.25 |
| DAP Monomer | 24.00 |
| Di-cumyl peroxide | 13.30 |
| Oleic acid | 13.30 |
| DAP Polymer | 600.00 |
| Colloidal silica | 40.00 |

Additionally, only three layers of the kraft phenolic filler structure were used.

EXAMPLE 8

Example 7 is repeated in all essential details except that underneath the bottom layer of the kraft phenolic filler structure there is positioned a ¼" cement-asbestos board primed with a phenol-formaldehyde resin on its upper surface and covered with a thin paper adhesive resin sheet and the pressure used was 300 p.s.i.

EXAMPLE 9

Example 1 is repeated in every essential detail except that a commercially available epoxy resin made by reacting bisphenol A with epichlorohydrin suitably catalyzed is used in place of the diallyl phthalate resin.

EXAMPLE 10

Example 1 is repeated in every essential detail except that a commercially available melamine-formaldehyde resin made by reacting 3.0 moles of formaldehyde with 1.0 mole melamine is substituted for the diallyl phthalate resin.

EXAMPLE 11

Example 1 is repeated in every essential detail except that a commercially available acrylic resin containing hydroxyl functional groups cured with hexakismethoxymethyl melamine is used in place of the diallyl phthalate resin.

EXAMPLE 12

Example 1 is repeated in every essential detail except that the decorative paper print sheet is treated with a resin mixture composed of 85 parts (solids) of a commercially available acrylic resin emulsion blended with 15 parts (solids) of a melamine-formaldehyde resin solution instead of the normal melamine-formaldehyde print saturating resin.

We claim:

1. A process for preparing a decorative laminate comprising (A) superimposing in stacked relationship an assembly of (a) a rigidity imparting base member, (b) a decorative fibrous sheet impregnated with a noble thermosetting resin and (c) a flexible release transfer sheet, coated on one side only, with a film of uniform thickness of a transparent noble thermosetting resin in contact with the decorative sheet, (B) heat and pressure consolidating the entire assembly into a unitary structure, converting said thermosetting resin to the thermoset state, securely bonding said film to the decorative sheet and (C) removing the flexible release sheet.

2. The process according to claim 1 in which the noble resin coated on the release sheet is a polymer of a diallyl ester of a phthalic acid.

3. The process according to claim 2 in which the polymer is poly(diallyl phthalate).

4. The process according to claim 2 in which the polymer is poly(diallylhexahydrophthalate).

5. The process according to claim 2 in which the polymer is poly(diallyltetrachlorophthalate).

6. The process according to claim 1 in which the noble resin coated on the release sheet is a self-crosslinkable, normally solid, noncrystalline polyester resin composition comprising the esterification product of
   (A) from about 34 to 49 mol percent of a cycloaliphatic dihydric alcohol having one ring of 6 carbon atoms,
   (B) from about 1 to 16 mol percent of an asymmetrical, linear aliphatic dihydric alcohol,
   (C) from about 30 to 49 mol percent of an $\alpha,\beta$-ethylenically unsaturated dicarboxylic acid selected from the group consisting of fumaric acid and itaconic acid and
   (D) from about 1 to 20 mol percent of a cycloaliphatic dicarboxylic acid having one ring of 6 carbon atoms, wherein the total mol percent of all components is 100%.

7. The process according to claim 6 in which said polyester is admixed with a monomeric cross-linking agent.

8. The process according to claim 7 in which the cross-linking agent is a monomeric polyacrylate.

9. The process according to claim 8 in which the monomeric polyacrylate is ethylene glycol dimethacrylate.

10. The process according to claim 8 in which the monomeric polyacrylate is trimethylolpropane trimethacrylate.

References Cited

UNITED STATES PATENTS

| 2,898,973 | 8/1959 | Marsh | 161—406X |
| 3,117,053 | 1/1964 | Lawrence et al. | 161—97X |
| 3,294,618 | 12/1966 | Busche et al. | 161—97 |

FOREIGN PATENTS

| 967,138 | 8/1962 | Great Britain | 156—247 |

LELAND A. SEBASTIAN, Primary Examiner

U.S. Cl. X.R.

156—240, 247, 277, 309, 332; 161—406, 413

UNITED STATES PATENT OFFICE
CERTIFICATE OF CORRECTION

Patent No. 3,551,241  Dated December 29, 1970

Inventor(s) Albert Joseph Heeb and Gene Edward Grosheim.

It is certified that error appears in the above-identified patent and that said Letters Patent are hereby corrected as shown below:

Column 1, line 25, change "derocative" to --decorative--

Column 5, line 55, change "silic" to --silica--

Column 7, line 5, change "graft" to --kraft--

Column 9, line 12, change "Di-Cumyl Peroxide 13.30" to --Di-Cumyl Peroxide 31.25--

Signed and sealed this 23rd day of March 1971.

(SEAL)
Attest:

EDWARD M. FLETCHER, JR.
Attesting Officer

WILLIAM E. SCHUYLER,
Commissioner of Paten